(12) United States Patent
Porad

(10) Patent No.: US 7,064,668 B2
(45) Date of Patent: Jun. 20, 2006

(54) REDUCING ELECTROMAGNETIC INTERFERENCE IN RADIO FREQUENCY IDENTIFICATION APPLICATIONS

(75) Inventor: Kenneth D. Porad, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/973,856

(22) Filed: Oct. 25, 2004

(65) Prior Publication Data

US 2006/0097057 A1    May 11, 2006

(51) Int. Cl.
*G08B 13/14* (2006.01)

(52) U.S. Cl. .............................. 340/572.1; 340/572.8; 235/439

(58) Field of Classification Search .......... 340/572.1, 340/572.8, 5.92; 235/385, 439, 446, 450, 235/493
See application file for complete search history.

(56) References Cited

U.S. PATENT DOCUMENTS

| | | | | |
|---|---|---|---|---|
| 5,666,105 | A | * | 9/1997 | Adler et al. ................. 340/600 |
| 6,242,510 | B1 | * | 6/2001 | Killey ......................... 523/204 |
| 2003/0145945 | A1 | * | 8/2003 | Kennedy .................... 156/289 |
| 2003/0174099 | A1 | * | 9/2003 | Bauer et al. ................. 343/893 |

* cited by examiner

*Primary Examiner*—Toan N. Pham
(74) *Attorney, Agent, or Firm*—MacPherson Kwok Chen & Heid LLP; Greg J. Michelson

(57) ABSTRACT

Systems and methods are disclosed herein for radio frequency identification (RFID) applications. For example, in accordance with an embodiment of the present invention, an RFID label is attached to an item (e.g., a metal object or a metal surface of the item) via an absorber to reduce electromagnetic interference.

20 Claims, 1 Drawing Sheet

REDUCING ELECTROMAGNETIC INTERFERENCE IN RADIO FREQUENCY IDENTIFICATION APPLICATIONS

TECHNICAL FIELD

The present invention relates generally to radio frequency applications and, more particularly, to systems and methods for reducing electromagnetic interference in radio frequency identification applications.

BACKGROUND

It is often desirable to label an item, such as for inventory, tracking, identification, or other applications. For example, the items that are stored in or move through a warehouse or a retail store may be tracked by their label's information for inventory control or supply chain management.

There are various types of labels, which may be employed. For example, a traditional nameplate may be affixed to an item, but the nameplate has certain drawbacks in that it is generally not readable by a machine, must be within a line-of-sight to be read, and consequently, may result in human data entry errors that significantly increase associated costs. As another example, a barcode label may be affixed to an item, but the barcode is limited in that it is a static device (e.g., once printed, its data cannot be changed without replacing the nameplate) and requires an optical line-of-sight to be read by a barcode reader.

As another example of a label, a radio frequency identification (RFID) device (e.g., an RFID tag, an RFID label, or an RFID smart label) may be affixed to an item. A typical RFID device includes a microchip and an antenna, with data transferred via radio frequency waves between the RFID device and an RFID reader. For example, a passive RFID device utilizes the radio frequency (RF) waves emitted by the RFID reader to energize the RFID device, which then modulates and scatters back the RF waves to provide its information to the RFID reader. The RFID device provides certain advantages over other types of labels, such as no line-of-sight requirement and read/write capability.

However, one drawback of the RFID device is that metal objects, including metal mesh or metalized plastics that are near or between the RFID device and the RFID reader, may interfere with the transfer of information via the radio frequency waves between the RFID device and the RFID reader. For example, the interference may result in a failed read or write attempt or possibly insufficient radio frequency power reaching the RFID device for activation. As a result, there is a need for improved RFID techniques.

SUMMARY

Systems and methods are disclosed herein for radio frequency identification (RFID) applications. For example, in accordance with an embodiment of the present invention, an RFID device is attached to an item (e.g., a metal object or a metal surface of the item) via an absorber. The absorber may reduce electromagnetic interference, such as for example electromagnetic interference that may have resulted from the RFID device being directly affixed to the item (i.e., without the absorber).

More specifically, in accordance with one embodiment of the present invention, a radio frequency identification label includes a radio frequency identification device adapted to transfer information to a radio frequency identification reader; and an absorber, coupled to the radio frequency identification device, adapted to reduce electromagnetic interference for the radio frequency identification device.

In accordance with another embodiment of the present invention, a radio frequency identification system includes a radio frequency identification label; and an absorber, coupled to the radio frequency identification label, adapted to reduce electromagnetic interference for the radio frequency identification label.

In accordance with another embodiment of the present invention, a method of reducing electromagnetic interference for a radio frequency identification system includes providing a radio frequency identification label; providing an absorber; attaching the radio frequency identification label to an item, wherein the absorber is disposed at least partially between the radio frequency identification label and the item.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
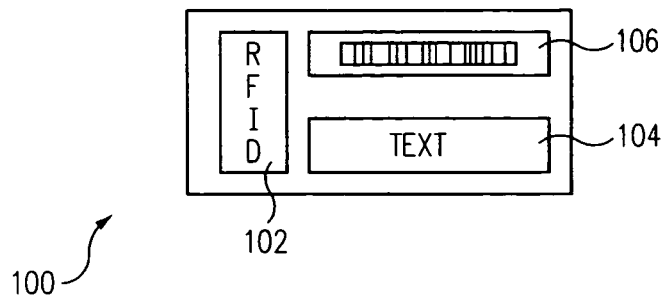
FIG. 1 shows a diagram illustrating a radio frequency identification device in accordance with an embodiment of the present invention.

FIG. 1 shows a diagram illustrating a radio frequency identification (RFID) label 100 in accordance with an embodiment of the present invention. RFID label 100 includes an RFID device 102, which may represent any type of RFID chip or system for RFID applications as would be known by one skilled in the art.

For example, RFID device 102 may represent (or may be known or referred to as) an RFID chip, an RFID inlay, or an RFID tag. The operating frequency for RFID device 102, for example, may fall generally within certain recognized standard frequencies, such as for example a low frequency range (e.g., 100 to 500 kHz), a medium frequency range (e.g., 10 to 15 MHz), or a high frequency range (e.g., 850 to 950 MHz).

RFID label 100 may include only RFID device 102, which may be encapsulated within RFID label 100 or otherwise packaged to protect RFID device 102, as necessary depending upon the desired application and type of RFID device 102 implemented. Furthermore, RFID label 100 may be represented solely by RFID device 102 (i.e., RFID label 100 is nothing more than RFID device 102). Alternatively or optionally, RFID label 100 may further include a text portion 104 and/or a barcode portion 106.

RFID device 102 and, if included, text portion 104 and barcode portion 106 may be positioned within any area of RFID label 100. Furthermore, text portion 104 and barcode portion 106 may not be confined to defined areas and may be interspersed or otherwise intermingled as desired.

Text portion 104 may include numbers, letters, symbols, and/or any other type of characters that would typically be decipherable by a person. For example, text portion 104 may include a serial number, an identifying name, a relevant date, or other information to be associated with an item that RFID label 100 is or will be attached to and that may provide some information to the person.

Barcode portion 106 may include information presented in a barcode format. Barcode portion 106 may or may not include the same information as is found in text portion 104. However, the information provided by barcode portion 106 generally would include (but not necessarily) some relevant information to be associated with an item that RFID label 100 is or will be attached to and that may be read by a barcode reader.

In general, RFID label 100 may be as described above or may represent any type of conventional RFID device, such as for example an RFID tag or an RFID smart label. However, as noted herein, one drawback associated with conventional RFID devices is that metal objects, including metal mesh or metalized plastics that are in close proximity with the RFID label, may interfere with the transfer of information via the electromagnetic waves between RFID label 100 and the RFID reader (not shown).

For example, one exemplary RFID application, in accordance with an embodiment of the present invention, applies to maintenance activity associated with a vehicle (e.g., a truck or an aircraft) that may be performed based on an RFID label's information associated with a particular part on the vehicle. As a specific example, airlines may need to uniquely identify repairable and time controlled parts to support their business activities (e.g., airworthiness directive compliance monitoring, warranty claim processing, rogue parts identification, repair history including upgrade modifications, part flight hours and landings tracking, and inventory control and spares pooling). Thus, RFID labels affixed to various parts on an aircraft may improve airline configuration control and help airlines reduce ownership costs by managing repairs, modifications, and minimizing inventories.

However, conventional RFID labels are limited in their use for aviation, for example, because when a conventional RFID label is applied to a metal surface, such as a part of an aircraft (e.g., the chassis of a typical line replaceable unit on the aircraft), there may be significant interference with the electromagnetic waves (e.g., directed or reflected radio frequency energy). Consequently, the RFID reader fails to properly read from or write to the RFID label (e.g., due to, for example, insufficient power received to energize the RFID label or reflected and/or backscattered radio frequency waves from the metal surface).

Figure 2:
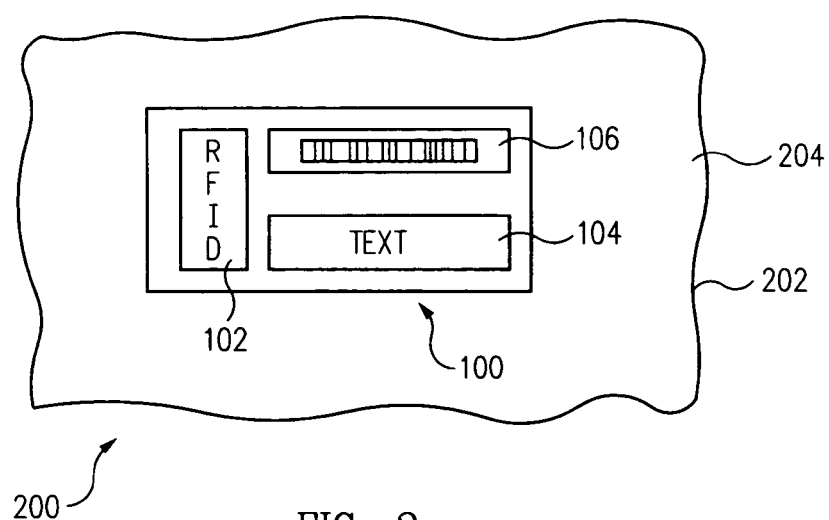
FIG. 2 shows a diagram illustrating the radio frequency identification device affixed to an item in accordance with an embodiment of the present invention.

In accordance with an embodiment of the present invention, systems and methods are disclosed to minimize electromagnetic interference in RFID applications (e.g., passive RFID smart label applications). For example, FIG. 2 shows a diagram 200 illustrating RFID label 100 affixed to an item 202 in accordance with an embodiment of the present invention.

Item 202 may represent, for example, a part or a portion of a part of an aircraft, as indicated in the exemplary application described herein, or may represent any other object (e.g., a canned good) to which it is desired to attach an RFID device. RFID label 100 may be attached to item 202 at an area 204, which may be made of metal, include some metal components, or is in close proximity to a metal or metalized component.

As discussed herein, radio frequency interference generally would be expected to occur due to RFID label 100 being attached to or in close proximity to metal or metalized components. However, in accordance with an embodiment of the present invention, RFID label 100 is attached to item 202 via an absorber, as described herein, which reduces electromagnetic interference sufficiently to allow for proper operation of RFID label 100.

Figure 3:
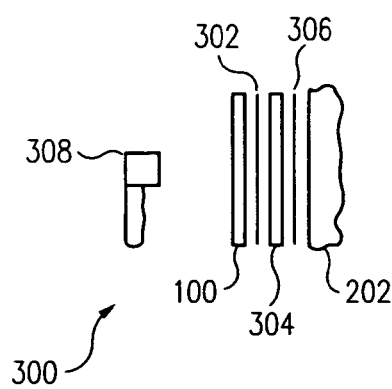
FIG. 3 shows a diagram illustrating a side view of the radio frequency identification device affixed to the item in accordance with an embodiment of the present invention.

For example, FIG. 3 shows a diagram 300 illustrating a side view of RFID label 100 affixed to item 202 via an absorber 304 in accordance with an embodiment of the present invention. RFID label 100 may be attached to absorber 304, for example, via an adhesive 302 or by any other method that would be known by one skilled in the art. Absorber 304 may be attached to item 202, for example, via an adhesive 306 or by any other method that would be known by one skilled in the art.

RFID device 102, for example, may be positioned in general at or in any area of RFID label 100. Absorber 304 may be positioned, for example, to cover all of RFID label 100 (e.g., including some overlap or additional area beyond the boundaries of RFID label 100). Alternatively, absorber 304 may be positioned only to cover the area between RFID device 102 and item 202 and possibly some additional portion of RFID label 100, as desired, with the remaining portion of RFID label 100 secured to item 202 via an adhesive or other method as would be known by one skilled in the art.

Absorber 304 functions, for example, to reduce electromagnetic interference around or near RFID label 100 sufficiently to allow proper operation of RFID label 100. Consequently, when an RFID reader 308, which may be positioned some distance away from RFID label 100, attempts to read from or write to RFID label 100, absorber 304 sufficiently minimizes the electromagnetic interference (e.g., generated between RFID label 100 and a metal surface of item 202) to allow RFID label 100 to properly operate.

In general, absorber 304 may be any type of material that attenuates electromagnetic energy (e.g., radio frequency energy) in the frequency range of RFID label 100. As an example, absorber 304 may be a flexible, magnetically loaded, electrically non-conductive, silicone, free space absorber that can be positioned between RFID label 100 (e.g., an RFID tag) and the attaching surface (i.e., area 204 of item 202). Depending upon the desired application or expected environment, absorber 304 may include one or more properties, such as for example absorber 304 may be flame resistant, moisture resistant or impervious to moisture, resistant to fungal growth, low out-gassing (e.g., for space applications), and/or able to operate continuously at high temperatures (e.g., a service temperature of 425 degrees Fahrenheit).

As a specific implementation example, in accordance with an embodiment of the present invention, RFID device 102 may represent an RFID inlay (e.g., an integrated microchip, EEPROM, and antenna), such as a my-d vicinity product from Infineon Technologies AG of Munich, Germany, which operates at a frequency of 13.56 MHz and is encapsulated within RFID label 100. Absorber 304, for example, represents an ECCOSORB® FGM 40 absorber material from Emerson & Cuming Microwave Products, Inc. of Randolph, Mass.

For this specific implementation example, it should be noted that the data sheet for ECCOSORB® FGM 40 absorber material has a general suggested frequency range of 4 to 10 GHz. However, it has been discovered that ECCOSORB® FGM 40 absorber material provides sufficient attenuation generally for proper operation at the 13.56 MHz operating frequency of RFID device 102 for this example.

Continuing with the specific implementation example, in accordance with an embodiment of the present invention, RFID label 100 may be secured to absorber 304, for example, by an appropriate adhesive, such as for example a pressure sensitive adhesive (ECCOSORB® FGM-XX/SS-6M) from Emerson & Cuming Microwave Products, Inc. of Randolph, Mass. Absorber 304 may be secured to item 202, for example, by an appropriate adhesive, such as for example a Dow Corning RTV 732 Multi-Purpose Silicone Sealant from Dow Corning Corporation of Midland, Mich.

In general, in accordance with one or more embodiments of the present invention, systems and methods are disclosed to reduce electromagnetic interference in RFID applications. For example, an RFID device is disclosed that functions properly, even when attached to a metal surface, due to an absorber material placed between the RFID device and the metal surface. It should be understood that RFID device does not have to be attached to the absorber material, but rather the absorber material, for example, can simply be positioned between the RFID device and an item attached to the RFID device. Furthermore, the item is not limited to any particular item, but could be any item, including for example an employee badge, a container, a sales good, or a part of a vehicle.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A radio frequency identification label comprising:
    a radio frequency identification device adapted to transfer information to a radio frequency identification reader, wherein the radio frequency identification device operates within a frequency range of approximately 12 to 15 MHz; and
    an FGM 40 absorber, coupled to the radio frequency identification device, adapted to reduce electromagnetic interference for the radio frequency identification device.

2. The radio frequency identification label of claim 1, wherein the radio frequency identification device operates at a frequency of approximately 13.56 MHz.

3. The radio frequency identification label of claim 1, wherein the radio frequency identification label further comprises a smart label which encapsulates the radio frequency identification device, wherein the radio frequency identification label further comprises on a first surface at least one of a text portion and a barcode portion.

4. The radio frequency identification label of claim 1, wherein the absorber is coupled to the radio frequency identification device with an adhesive.

5. The radio frequency identification label of claim 1, wherein the radio frequency identification device is encapsulated and coupled to the absorber with an adhesive.

6. The radio frequency identification label of claim 1, wherein the radio frequency identification label is adapted to be secured to an item with the absorber at least partially disposed between the radio frequency identification device and the item.

7. The radio frequency identification label of claim 6, wherein the item comprises a part of a vehicle.

8. A radio frequency identification system comprising:
    a radio frequency identification label adapted to operate within a frequency range of approximately 12 to 15 MHz; and
    an FGM 40 absorber, coupled to the radio frequency identification label, adapted to reduce electromagnetic interference for the radio frequency identification label.

9. The radio frequency identification system of claim 8, further comprising a radio frequency identification reader adapted to read information stored by the radio frequency identification label.

10. The radio frequency identification system of claim 8, wherein the absorber is further adapted to couple to an item, the absorber being at least partially disposed between the radio frequency identification label and the item.

11. The radio frequency identification system of claim 10, wherein the absorber is coupled to the radio frequency identification label with a first adhesive and coupled to the item with a second adhesive.

12. The radio frequency identification system of claim 10, wherein the item is part of a vehicle.

13. The radio frequency identification system of claim 8, wherein the radio frequency identification label comprises at least one of a radio frequency identification chip, a radio frequency identification inlay, a radio frequency identification tag, and a radio frequency identification smart label.

14. The radio frequency identification system of claim 8, wherein the radio frequency identification label further comprises at least one of textual information and barcode information.

15. The radio frequency identification system of claim 8, wherein the radio frequency identification label operates at a frequency of approximately 13.56 MHz.

16. A method of reducing electromagnetic interference for a radio frequency identification system for a vehicle maintenance system, the method comprising:
    providing a radio frequency identification label adapted to operate within a frequency range of approximately 12 to 15 MHz;
    providing an FGM 40 absorber; and
    attaching the radio frequency identification label to an item comprising a replaceable part of the vehicle, wherein the absorber is disposed at least partially between the radio frequency identification label and the item.

17. The method of claim 16, further comprising coupling the absorber to the radio frequency identification label with a first adhesive and wherein the attaching comprises coupling the absorber to the item with a second adhesive.

18. The method of claim 16, wherein the absorber is adapted to reduce electromagnetic interference in the radio frequency identification system.

19. The method of claim 16, further comprising reading information stored in the radio frequency identification label.

20. The method of claim 16, wherein the radio frequency identification label stores information useful for maintenance associated with the item.

* * * * *